United States Patent [19]

McAuliffe et al.

[11] Patent Number: 4,969,088
[45] Date of Patent: Nov. 6, 1990

[54] HARDWARE MECHANISM FOR AUTOMATICALLY DETECTING HOT-SPOT REFERENCES AND DIVERTING SAME FROM MEMORY TRAFFIC IN A MULTIPROCESSOR COMPUTER SYSTEM

[75] Inventors: Kevin P. McAuliffe, Yorktown Heights; Vern A. Norton, Croton-on-Hudson; Gregory F. Pfister, Briarcliff Manor; Bharat D. Rathi, Mahopac, all of N.Y.

[73] Assignee: International Business Machines Corporation, Armonk, N.Y.

[21] Appl. No.: 186,327

[22] Filed: Apr. 26, 1988

[51] Int. Cl.$^5$ .............................................. G06F 15/16
[52] U.S. Cl. ................................. 364/200; 364/228.1; 364/228.3; 364/243; 364/243.1
[58] Field of Search ................... 264/200, 900; 370/60, 370/89

[56] References Cited

U.S. PATENT DOCUMENTS

| | | | |
|---|---|---|---|
| 4,400,768 | 8/1983 | Tomlinson | 364/200 |
| 4,412,286 | 10/1983 | O'Dowd et al. | 364/200 |
| 4,466,060 | 8/1984 | Riddle | 364/200 |
| 4,484,262 | 1/1984 | Sullivan et al. | 364/200 |
| 4,556,972 | 12/1985 | Chan et al. | 370/60 |
| 4,654,778 | 3/1987 | Chiesa et al. | 364/200 |
| 4,696,000 | 9/1987 | Payne, III | 370/60 |
| 4,707,781 | 11/1987 | Sullivan et al. | 364/200 |
| 4,794,521 | 11/1988 | Ziegler et al. | 364/200 |

OTHER PUBLICATIONS

Allan Gottleib, Ralph Grishman, Clyde P. Kruskal, Kevin P. McAuliffe, Larry Rudolph, Marc Snir—The NYU Ultracomputer-Designing an MIMD Shared Memory Parallel Computer, IEEE Trans. on Computers, vol. C—32, 2/83.

G. F. Pfister, W. C. Brantley, D. A. George, S. L. Harvey, W. J. Kleinfelder, K. P. McAluliffe, E. A. Melton, V. A. Norton, J. Weiss, The IBM Research Parallel Processor Prototype (RP3): Introduction and Architecture, Proc. 1985 Int'l. Conf. on Parallel Processing.

A. Norton, G. F. Pfister, A Methodology for Predicting Multiprocessor Perfomance Proceedings of the 1985 International Conference on Parallel Processing.

W. C. Brantley, K. P. McAuliffe, J. Weiss, RP3 Processor-Memory Element, Proceedings of the 1985 International Conference on Parallel Processing.

G. F. Pfister and V. A. Norton, "Hot Spot" Contention and Combining in Multistage Interconnection Networks; Proceedings, International Conf. on Parallel Processing, Aug. 20–23, 1985, pp. 790–795.

*Primary Examiner*—Raulfe B. Zache
*Attorney, Agent, or Firm*—Roy R. Schlemmer

[57] ABSTRACT

An interconnection network management architecture for use with a large shared memory multiprocessor computing system including a plurality of processors and a plurality of separately addressable main memory modules. Two parallel, interconnection networks are provided each capable of interconnecting any processor to any memory module, and each having different latency characteristics. A Hot-Spot detection mechnaism is associated with each main memory module for detecting when a particular address in that module has become a Hot Spot and includes a first memory for storing all detected Hot Spots. A diverter element is associated with each processor for selectively routing memory requests over either the first or second memory network contingent on its status as a Hot Spot. A second memory is included in each diverter element for storing all Hot Spots detected by the detector elements. A control mechanism determines if any current main memory address is a listed Hot Spot within the second memory and, if so, causes the main memory reference to be transmitted to the memory system over a selected interconnection network. Another component of this mechanism determines if a particular address has been accessed a sufficient number of times within a given timeframe to be deemed a Hot Spot and removes Hot Spots from both the first and second memories when necessary.

23 Claims, 13 Drawing Sheets

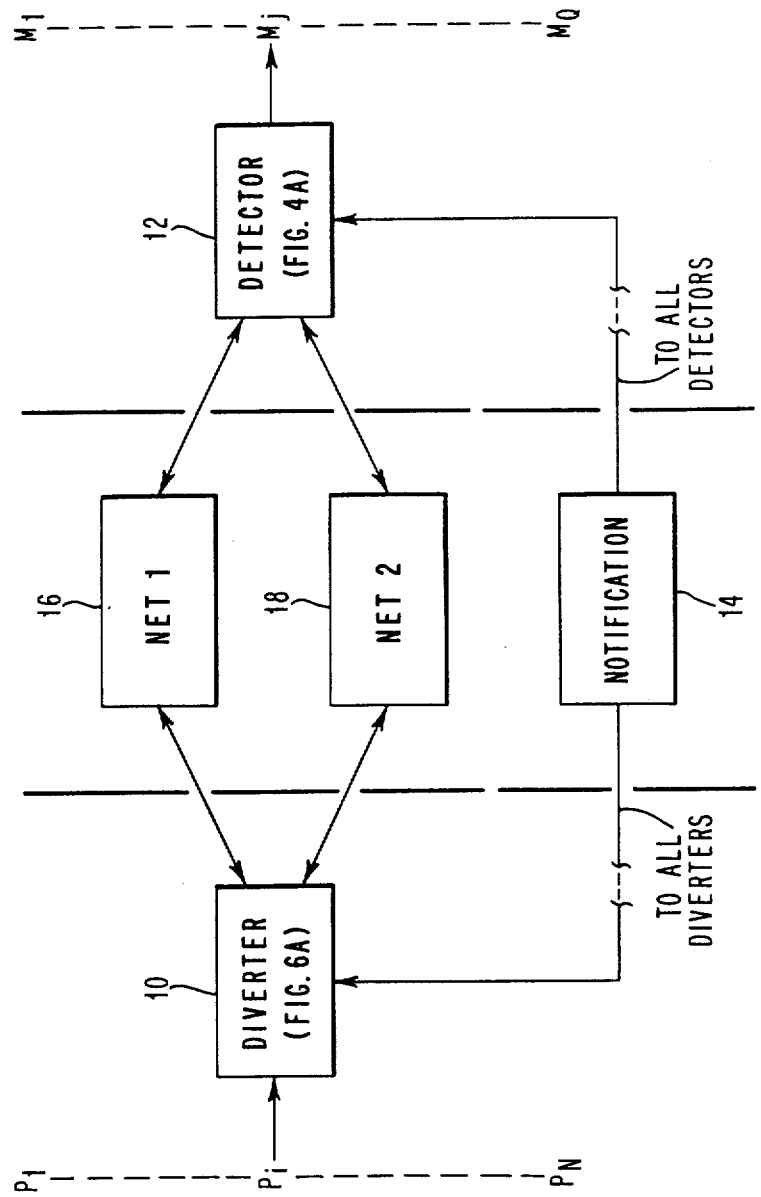

FIG. 4B

HOT SPOT MEMORY FORMAT

| ADDRESS | REF. COUNT | TIME STAMP (OPTIONAL) | HOT SPOT (H) | NOTIFICATION COMPLETION (C) |
|---------|------------|------------------------|--------------|------------------------------|
|         |            |                        |              |                              |

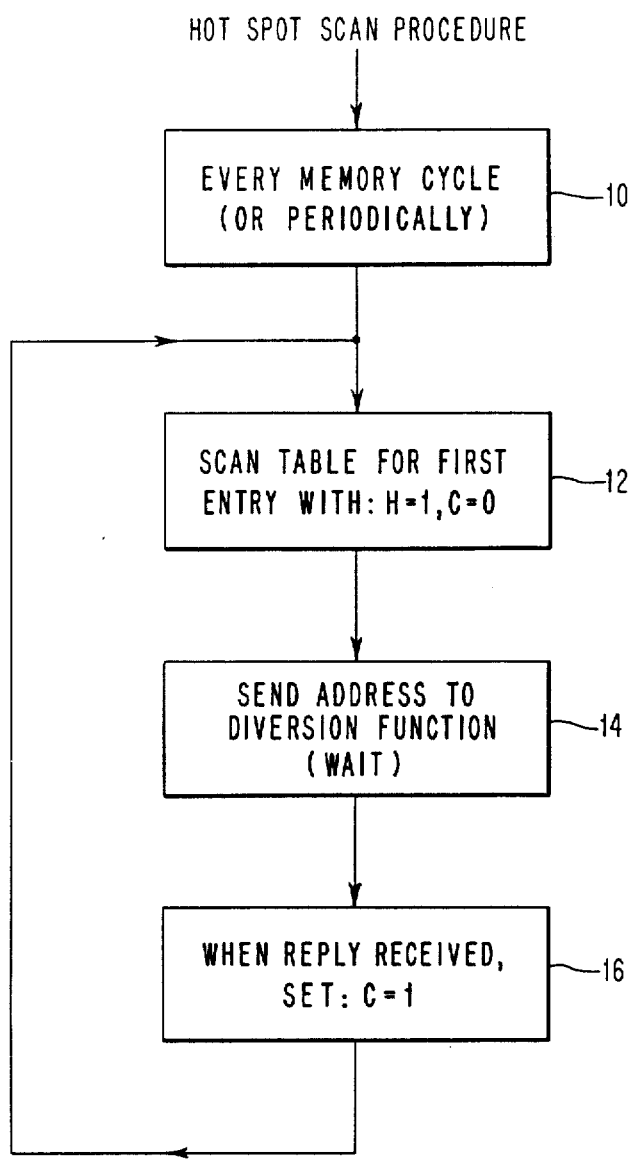

NOTE: THE TERMINATION MESSAGE (2) WILL ALWAYS BE ON THE BUS CYCLE IMMEDIATELY AFTER MESSAGE (1)

FIG. 6B

HOT SPOT LOOKASIDE
BUFFER FORMAT

| ADDRESS | TIME STAMP |
|---------|------------|
|         |            |

HARDWARE MECHANISM FOR AUTOMATICALLY DETECTING HOT-SPOT REFERENCES AND DIVERTING SAME FROM MEMORY TRAFFIC IN A MULTIPROCESSOR COMPUTER SYSTEM

Field of the Invention

The present invention relates to data processor storage systems and, more particularly, to such storage system controls for use in a large multiprocessor computer system having a plurality of processors and a plurality of individual memory modules. Still more particularly, it relates to controlling data flow between individual processors and memory modules over a complex interconnection network.

Background of the Invention

Recent studies have shown that the memory systems of large parallel computers can potentially suffer from a performance-crippling defect. If a significant fraction of memory references are addressed to one memory address, the performance of the whole system can be limited by the capacity of that one memory. If access to that memory is via a multistage interconnection network, a phenomenon known as "tree blockage" will result in additional contention, causing substantial delays to all users of that system.

This problem and related performance issues are discussed in an article, "Hot-Spot Contention and Combining in Multistage Interconnection Networks," specifically referenced in the subsequent "Prior Art" section.

One solution to this problem is a "combining network," as proposed in the NYU Ultracomputer design (see "The NYU Ultracomputer—Designing a MIMD, Shared Memory Parallel Machine," IEEE Transactions on Computers, February 1983, pp. 175–189). The combining network causes references to the memory Hot Spot to be combined enroute to memory, reducing the contention for the Hot Spot; however a combining network is a complex and expensive hardware design. It is currently difficult if not infeasible to build a combining network of sufficiently low latency to sustain all memory references in a large multiprocessor system. An alternative approach is to build two networks, one for low latency and one other capable of handling high contention traffic, and to divert those messages which are expected to cause Hot Spots into the second network. However, the problem remains of effectively selecting the Hot-Spot references from general memory traffic. It is of course possible to rely on software or some predesignation of message types in such a system to avoid the Hot-Spot problem by designating what references are to Hot Spots. Thus the Hot Spots are pre-identified. Such a solution, however, is clearly unworkable in a large multi-user system, because the performance of the whole system will be dependent on correct and efficient programming by all users with an implied inference of consistency in designating what type of references are Hot Spots.

Thus, while the concept of an interconnection network for such a multiprocessor multimemory module interconnection system has been proposed having a low-latency network and a potential high-latency Hot-Spot combining network has been proposed, no efficient means or mechanism is known for dynamically identifying those messages which are Hot Spots and for subsequently controlling the interconnection mechanism.

CROSS-REFERENCE TO RELATED CO-PENDING PATENT APPLICATIONS

U.S. patent application Ser. No. 4,752,777 filed May 12, 1987 (a continuation of 713,117 filed Mar. 18, 1985) of P. A. Franaszek entitled, "Delta Network Control of a Cross-Point Switch," discloses, in essence, a two-network interconnection system for use in a multiprocessor system comprising a plurality of processors and a plurality of memories which must be interconnected over an appropriate interconnection network. In the system of this application, the concepts of a Delta Network are in essence combined with a simple cross-point switch network and, under certain circumstances, messages may be sent alternatively over either network. However, there is no suggestion in this patent of a method for continuously monitoring Hot Spots on a real-time basis and diverting subsequent memory references to these Hot Spots over a suitable combining network and sending other normal memory references over a low-latency network.

PRIOR ART

The following four articles co-authored by several of the present inventors generally describe the attributes of an experimental high-speed multiprocessor computing system known as the RP3 having a large shared memory. All four of these articles appear in the Proceedings of 1985 International Conference on Parallel Processing, Aug. 20–23, 1985.

1. Pfister, G.F.; Brantley, W.C.; George, D. A.; Harvey, S. L.; Kleinfelder, W. J.; McAuliffe, K. P.; Melton, E. A.; Norton, V. A.; and Weiss, J. "The IBM Research Parallel Processor Prototype (RP3): Introduction and Architecture," pp. 764–771 This article is tutorial in nature and describes an overall multiprocessor system in which the present invention has particular utility.

2. Norton, V. A. and Pfister, G. F. "A Methodology for Predicting Multiprocessor Performance," pp. 772–781. This article is also tutorial in nature and describes methods which attempt to predict a given multiprocessor performance and indicates some of the considerations used in predicting various types of memory blockages, etc., which can occur to seriously detract from the overall system performance. It is noted that these general concepts for evaluation and monitoring were instrumental in recognizing the need for the invention.

3. McAuliffe, K. P.; Brantley, W. C.; and Weiss, J. "The RP3 Processor/Memory Element," pp. 782≠789. This article describes a memory element for such a system and broadly describes some of the memory design considerations which affect overall memory performance, and is relevant to the present invention in that it is background information for the memory design of a large multiprocessor system.

4. Pfister, G. F. and Norton, V. A. "Hot-Spot Contention and Combining in Multistage Interconnection Networks," pp. 790–797. This article generally discusses the problems and interconnection network for a large multiprocessor system such as the RP3 and suggests the use of two separate interconnection networks over which memory references may be selectively sent to at least alleviate the Hot-Spot problem. As stated previously, this article, while suggesting the basic concept of two networks, does not suggest or disclose a specific method or mechanism by which Hot Spots can be detected and marked for use in control of the network. A number of additional references are included in the bibliography of this article, but none are believed as relevant as the article itself to the presen invention.

5. U.S. Pat. No. 3,956,737 of R. J. Ball entitled, "Memory System Parallel Access to Multi-word Blocks," May 11, 1976, was the most pertinent reference found in a Prior Art search; however, it is deemed to constitute only general background art as it relates neither to a multiprocessor system nor to a method for interconnecting a plurality of processors with selected memory modules or the detection and control of Hot Spots.

6. U.S. Pat. Nos. 4,484,262 and 4,707,781of Sullivan, et al., entitled, "Shared Memory Computer Method and Apparatus," and both having an effective filing date of Jan. 9, 1979, disclose a multiprocessor memory architecture comprising a plurality of processors and a plurality of separate memory units interconnected through a switching element or interconnection network. A method and architecture for queuing requests to the same memory module is disclosed which would assumably occur in the case of Hot-Spot references; however, a two separate network system is neither disclosed nor suggested, nor is any means of detecting Hot Spots and utilizing such information for controlling traffic over the two networks.

7. The following is a list of references found by means of the afore mentioned prior art search which generally constitute background art, but are not deemed sufficiently relevant to warrant specific discussion.

| 4,489,378 | (IBM) | 4,466,061 |
| 4,458,316 | (IBM) | 4,445,171 |
| 4,425,615 |       | 4,187,538 |
| 4,186,438 | (IBM) | 3,840,859 |
| 4,535,428 | (IBM) | 4,156,290 |
| 3,967,247 |       | 3,647,348 |
|           |       | 3,623,001 |

SUMMARY OF OBJECTS

It is a primary object of the present invention to provide an interconnection network management architecture for a large shared memory multiprocessing system.

It is a further object to provide such an interconnection network management architecture for such a system having at least one low-latency communication network and at least one other interconnection network.

It is a further object of the invention to provide such an interconnection network architecture including a means for diverting memory accesses to one or the other of said two networks based on memory addressing criteria.

It is yet another object of the invention to provide such an interconnection network architecture wherein the means for diverting such memory accesses utilizes Hot-Spot memory references as the diverting criterion. It is a further object of the invention to provide such an interconnection network architecture, further including means for dynamically detecting and removing Hot Spots as a system controlling criteria and utilizing said Hot Spots, when detected, to effect said message diversion.

The objects of the present invention are accomplished, in general, by an improved interconnection network architecture for use in a large shared memory multiprocessor computing system including a plurality of processors and a plurality of separately addressable memory modules, each of which is accessible by any of said processors over a memory interconnection network. The system comprises two parallel interconnecting memory networks, each capable of interconnecting any processor to any memory module, said networks comprising: a first low-latency network over which memory requests having a "low" probability of memory contention are routed; and a second network over which memory requests having a higher probability of memory contention are routed. Hot-Spot detection means are associated with each memory module for detecting when a particular address in that module has become a Hot Spot. Diverter means are associated with each processor and the memory network for selectively routing memory requests to either said first or second memory network.

Hot-Spot notification means are provided for interconnecting all of said detection means with all of said diverter means. Memory means are provided in each of said diverter means for storing all Hot Spots detected by any of said detection means. Means are operative in each of said diverter means for determining if a current memory access is a listed Hot Spot within said memory system and, if so, for causing the memory access to be transmitted to the memory system over the second interconnection network Each said detection means includes means for determining if a particular address has been repeated a sufficient number of times within a given timeframe to be deemed a Hot Spot and, if so, for notifying all of the diverter means associated with each processor of this fact, enclosing the new Hot-Spot address to be stored therein for subsequent use by each said diverter means.

BRIEF DESCRIPTION OF THE DRAWINGS

FIG. 3 comprises a high-level functional block diagram illustrating the primary functional units of the present invention associated with a typical processor and memory module of a multiprocessor system.

FIG. 6B illustrates the format for the Hot-Spot lookaside buffer of FIG. 6A.

DESCRIPTION OF THE PREFERRED EMBODIMENT

Figure 1:
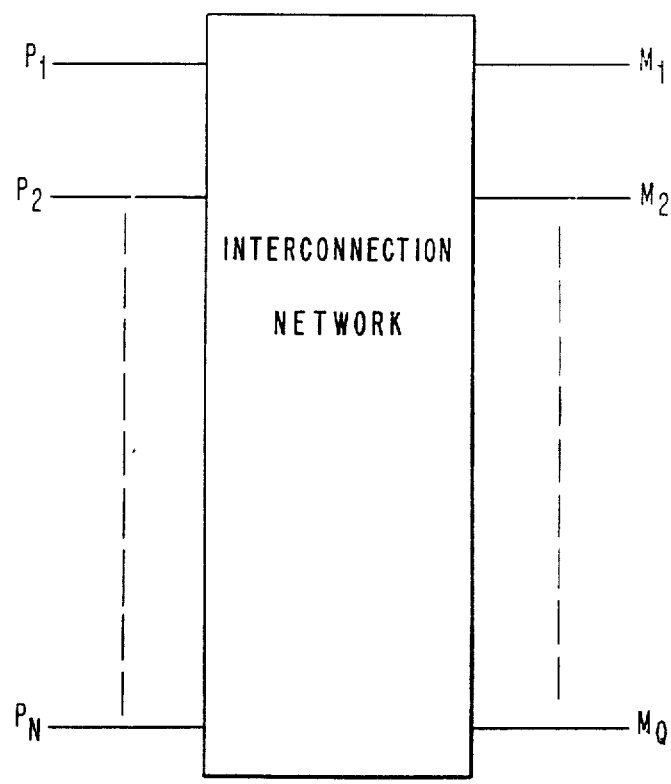
FIG. 1 is an organizational drawing of a large Prior Art multiprocessor system a large shared main memory and an interconnection network therefor.

The invention set forth herein comprises an interconnection network management architecture for use with a large shared memory multiprocessing system which comprises a hardware technique for detecting Hot Spots in network traffic and diverting such memory references through a combining network. It should be clearly understood that the term "Hot Spot," refers to a repeated reference to the same memory location in a given memory module within a predetermined timeframe. As will be readily understood, the Hot-Spot designation may be changed at will by the system designers to fit different system uses. In other words, the total number of references to the same memory may be changed, as well as the timeframe. However, these latter features have no bearing on the underlying architecture which allows this level of control. There are numerous advantages to this technique for managing memory traffic. It may be readily designed to be automatic so that programmer error or carelessness cannot degrade the whole system (except, perhaps, performance for the user who has caused the inefficiency).

When traffic is diverted from one network to another, there is a potential loss of consistency due to a change in order of access to variables accessed by the same processor. For example, a load and store directed to the same address may not occur in the order issued if they travel over different networks. To maintain sequential consistency in software is awkward, and it may entail compiler support and/or substantial execution-time overhead. As will be appreciated by those skilled in the art, such consistency is absolutely critical in maintaining correct execution of programs within the system. The present invention provides a hardware procedure for ensuring sequential consistency, even though network traffic to the same memory may at times flow through different networks (e.g., combining or non-combining). Memory references issued by any one processor to any one memory address will occur in the order issued, regardless of the network on which they travel.

Because only the Hot-Spot references of the processors are diverted through the high-contention network, such a network can be built at a minimal cost, so as to be sufficient only to handle the projected Hot-Spot load which is likely to be encountered in a worst case scenario. If, for example, all synchronization traffic were diverted through a combining network, much of that traffic would not cause Hot Spots, yet would suffer the penalty of increased latency due to the fact that a combining network is a great deal more complex than a non-combining network and accordingly requires going through significantly more levels of logic, checking and comparisons due to the nature of such combining networks.

The hardware required to affect the interconnection control architecture of the present invention is believed to be small compared to the cost of building a combining network having sufficient bandwidth to provide adequate memory performance in such a large system where all memory accesses, regardless of their potential Hot-Spot status, would be required to go through this network. Further, the hardware and procedures required by the present invention can be overlapped with such functions as cache-lookup and translation functions; and it is believed that they should not add significantly to the overall time for a memory reference utilizing a single, very large low-latency network. At the same time the cost of such a network should be a fraction of the cost for a combining network, as stated previously.

As a side benefit of the herein disclosed interconnection network management architecture, information or data may be made available at run time indicating Hot Spots in memory reference traffic. It will therefore be possible to report this information to users of the systems, in order to correct software errors if the Hot Spot is not required by the application. Thus, it is possible that this information could be used to change the data organizations, etc., so that the data could be better distributed over the interleaved memory system to remove, or at least minimize, such Hot Spots.

The present architecture is intended to be employed in a system of many (e.g., ten or more) independent processing units. It is necessary that there be two communication networks, one capable of handling high contention traffic such as the combining network proposed by the New York University Ultracomputer project and described in detail in an article by A. Gottlieb, R. Grishman, C. P. Kruskal, K. P. McAuliffe, L. Rudolph and M. Snir, "The NYU Ultracomputer-Designing a MIMD Shared Memory Parallel Machine," IEEE Transactions on Computers, February 1983, pp. 175-189. The other network should be of sufficiently low latency to efficiently transmit all non-Hot-Spot references to the memory. Both networks are provided internally with hardware which will maintain sequential consistency, in the sense that the order of two messages to the same destination address arriving at any input is maintained to the network output. What this means is that no leapfrogging of messages is allowed to any one destination. In the present invention the use of a "fence" function, which will be described later, and atomic memory accesses, in the memory itself which ensure that one access is complete before another begins, are used to prevent such leap frogging.

The memory system is assumed to have one physical address space, so that one address determines a memory module as well as the location within the module of the particular word or addressable element. It is desirable to have certain other features which will reduce the likelihood of memory blockage being caused by factors beyond the scope of this invention. These would include:

1. Memory Interleaving. This should be done so as to minimize the memory conflicts which would result when many processors attempt to access different addresses within one page 2. Address Hashing or Skewing. This should be done to minimize the memory conflicts which would result from stride access conflicts to memory. For a suitable method of performing such hashing see for exemple a pending U.S. patent application Ser. No. 07/114,909 (YO9-86-052) of K. P. McAuliffe et al., filed 10/29/87 entitled "An Aperiodic Mapping Method to Enhance Power of Two Stride Access to Interleaved Devices"

3. Cacheing of Read-Only Data. This will prevent shared code and constants from resulting in Hot Spots since at most one access per processor will occur, at least within an immediate timeframe. Of course, if such data is not designated to be cacheable, the management architecture of the present invention will prevent it from causing a Hot Spot.

All of the above three features are architected in the large shared-memory multiprocessor configuration known as the RP3, referenced previously.

The present interconnection network management architecture will now be set forth in general functional terms followed by a detailed description of a preferred embodiment. The hardware required of the underlying architecture may be synopsized as follows.

Means are provided for determining Hot Spots referred to herein as a Hot-Spot detector element. This device or element monitors all memory references at a particular memory module, it being understood that each memory module will be provided with such a detector. It maintains counters tabulating the most recently accessed physical addresses in the memory. It requires an associative memory such as is conventionally used in cache directories (with or without set associativity). The access totals are tabulated by the detector element over a time-window of memory cycles, e.g., 1,000-10,000 cycles. However, this could be varied at the specification of the system designer. When the references to any one address are sufficiently frequent so as to constitute a Hot Spot, the Hot-Spot detector element activates the Hot-Spot notification bus to notify all diverter elements, as will be described below. It should be understood, as stated above, that the particular threshold at which a Hot Spot is deemed to exist can be varied, and for any given system would be experimentally determined. However, the particular threshold has no limitation on the overall architecture disclosed herein, as it would essentially be a count supplied to the system against which the Hot-Spot test would be recurrently made.

After obtaining control of the Hot-Spot notification bus, the detector element broadcasts the address to all of the diverter elements associated with each processor. These elements contain a memory means located therein designated as a Hot-Spot lookaside buffer which would optimally be an associative memory. A memory location which has already been designated a Hot Spot will repeatedly be redesignated (remain) as such until it ceases to be heavily accessed. The threshold for redesignating a previously designated Hot Spot may be lower than the threshold for initial determination of Hot Spots. This is because if, for example traffic has been diverted into a combining network, fewer memory Hot-Spot accesses will result due to the combining of such messages in the network. However, the architecture for redesignating a threshold for a particular Hot Spot, once designated, is not specifically disclosed in the present embodiment, as this would be an arbitrary design choice for the system designer. The function could be easily performed, however, by utilizing a two-tier threshold wherein a second lower threshold value would be utilized for previously designated Hot Spots, this could be accomplished by providing, for example, an extra bit in the Hot-Spot memory associated with each detector. The next major functional element of the system is the notification bus or Hot-Spot notification means. This bus provides a means for the various Hot-Spot detectors to communicate with all of the diverter elements and, thus, the Hot-Spot lookaside buffers located therein. All Hot-Spot detectors can transmit on the bus, and all Hot-Spot lookaside buffers within each diverter element are controlled by the messages sent over the bus. Access to the bus is resolved in a fair scheme, for example, a round-robin priority, so that each Hot-Spot detector can periodically take control of its own time period on the bus. The bandwidth of the bus should be sufficient to handle all such messages. It is expected that the bandwidth of such serial communication will be adequate for systems involving thousands of independent memory modules, if the bus cycle is comparable to the memory cycle time. The bus should be wide enough to transmit one physical address, plus whatever information is required to resolve control and error detection. Other means of communication from the Hot-Spot detector to the diverter elements can be used; it is not necessary that all messages arrive simultaneously at the diverter elements. For example, a token-passing ring may be adequate for this communication. It is clear that this would be a design choice, and would be determined by the speed of the remainder of the system as well as considerations of how much one is willing to invest in this particular piece of hardware. The last primary functional element of the present system is the diverter element, each of which contains a Hot-Spot lookaside buffer. The diverter elements are located between the various processors of the system and the network input ports. They require access to translated (physical) addresses of the system, and must accordingly be positioned after any memory-mapping function. The Hot-Spot lookaside buffers maintain look-up tables of all physical addresses currently designated as Hot Spots in the system. All of the Hot-Spot lookaside buffers maintain exactly the same list and operate (vis-a-vis adding Hot-Spots) completely under control of the Hot-Spot notification bus. Whenever a Hot-Spot address is designated, it is compared with the current contents of the buffer. If the address was previously designated, a time stamp is updated, indicating recent designation of Hot-Spot status. As will be apparent subsequently, this time stamp would be utilized in the replacement algorithm for the Hot-Spot lookaside buffers. If the address was not previously designated, the entry with the oldest time stamp is deleted and replaced by the current address. The previous description assumes that the Hot-Spot lookaside buffer comprises a completely associative memory. If, instead, a two-way or four-way associative look-up were used, the oldest entry within the same congruence class would be replaced by the new Hot-Spot address. Because the same replacement algorithm is used in each Hot-Spot lookaside buffer, they all maintain the same list of outstanding addresses. At the same time the lookaside buffer is updated, a "fence" operation is initiated at the processor node, causing further memory references at that node to be delayed until all outstanding memory requests have been satisfied. It should be understood that if the system is designed so that there is a cache at each processor node, it is only necessary to apply the fence to noncacheable references. The fence operation is only required when addresses are inserted or deleted from the lookaside buffer; no fence is required if the Hot-Spot address was previously designated; and no fence operation is required for subsequent references to a Hot Spot. In many architectures, a fence function is not needed, because only one reference is "allowed" to be pending at any one time. The function of the Hot-Spot lookaside buffers within each diverter element is to compare each translated address, as issued by the memory mapping unit, with the addresses in the buffer. All matching addresses are diverted to the high-contention network. Other references are allowed to proceed to the low-latency network. Look-up can proceed in parallel with time-stamp updating; however, during the time that an entry in the Hot-Spot lookaside buffer is being replaced, normal look-up functions of the buffer must be suspended.

There are a number of variables associated with the present system which must be set after consideration of system design and experimentation with different settings. Improper settings could result in excessive bus contention, or ineffective selection of Hot Spots. These include:

1. A time window used by the Hot-Spot detector element to detect Hot Spots.

2. The thresholds or number of references required for a designation as a Hot Spot.

3. The size, e.g., number of entries in the Hot-Spot lookaside buffer and also the Hot-Spot detector address buffer.

Having described the overall characteristics of the present interconnection network management architecture and the main functional components thereof, there will now follow a detailed description of the preferred embodiment of the invention as set forth in the accompanying drawings.

FIG. 1 illustrates the overall layout of a prior art multiprocessor system having a plurality of processors $P_1$-$P_n$ selectively connectible to a plurality of memory units $M_1$-$M_q$ over an appropriate interconnection network. As indicated previously, this interconnection network could be either a straightforward crosspoint switch or a complex combining network, both of which are known in the art. The number of processors and the number of separately addressable memory modules may or may not be the same, e.g., $n \neq q$. As will be apparent, the shortcomings of such an interconnection network are tied into the complexity or sophistication of the network itself.

Figure 2:
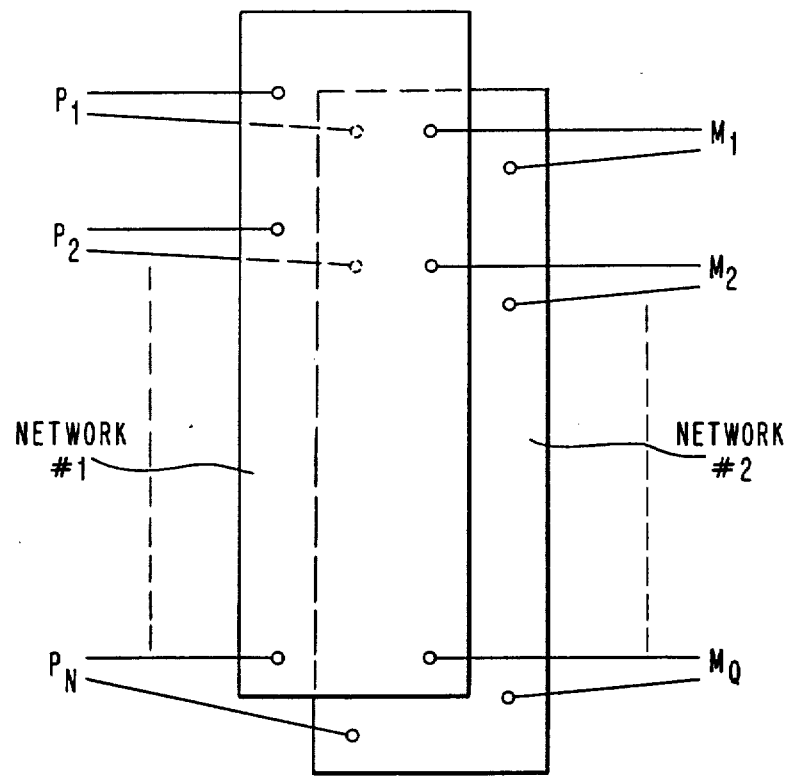
FIG. 2 comprises an organizational drawing similar to FIG. 1 of a multiprocessor-memory interconnection system incorporating two separate interconnection networks having different transmission characteristics suitable for use with the present invention.

FIG. 2 is a drawing similar to FIG. 1, but showing two possible interconnecting networks for selectively connecting the individual processors ($P_1$-$P_n$) to the individual memory modules ($M_1$-$M_q$) This is the sort of interconnection network organization set forth in the previously referenced article, "Hot Spot Contention and Combining in Multistage Interconnection Networks," wherein the network 1 would, for example, be a low-latency network and network 2 would for example be a significantly more complex combining network.

The Block Diagram of FIG. 2 does not specifically show a mechanism for making a decision as to whether an individual memory access would proceed via network 1 or network 2. As will be appreciated, this overall network diagram would apply equally well to the prior art networks mentioned or to the present invention. The significant feature of the present invention, of course, is that it provides a specific architecture whereby the decision function for diverting a message over either network 1 or network 2 is made on a dynamic basis rather than on some predetermined, fixed static basis (such as a software method operable in, for example, the compiler) whereby specific memory accesses would be specified on some predetermined basis as to whether they would proceed over network 1 or network 2. The present invention provides a dynamic interconnection network management architecture which makes the network routing decision based on dynamic factors of a particular problem running on the system. It would also be relatively easy to alter a number of the switching thresholds, as mentioned above, by merely changing the timeframe for the Hot-Spot detection cycle, the Hot-Spot reference threshold, or the actual sizes of the Hot-Spot lookaside buffer and the Hot-Spot detector address buffer.

Figure 6A:
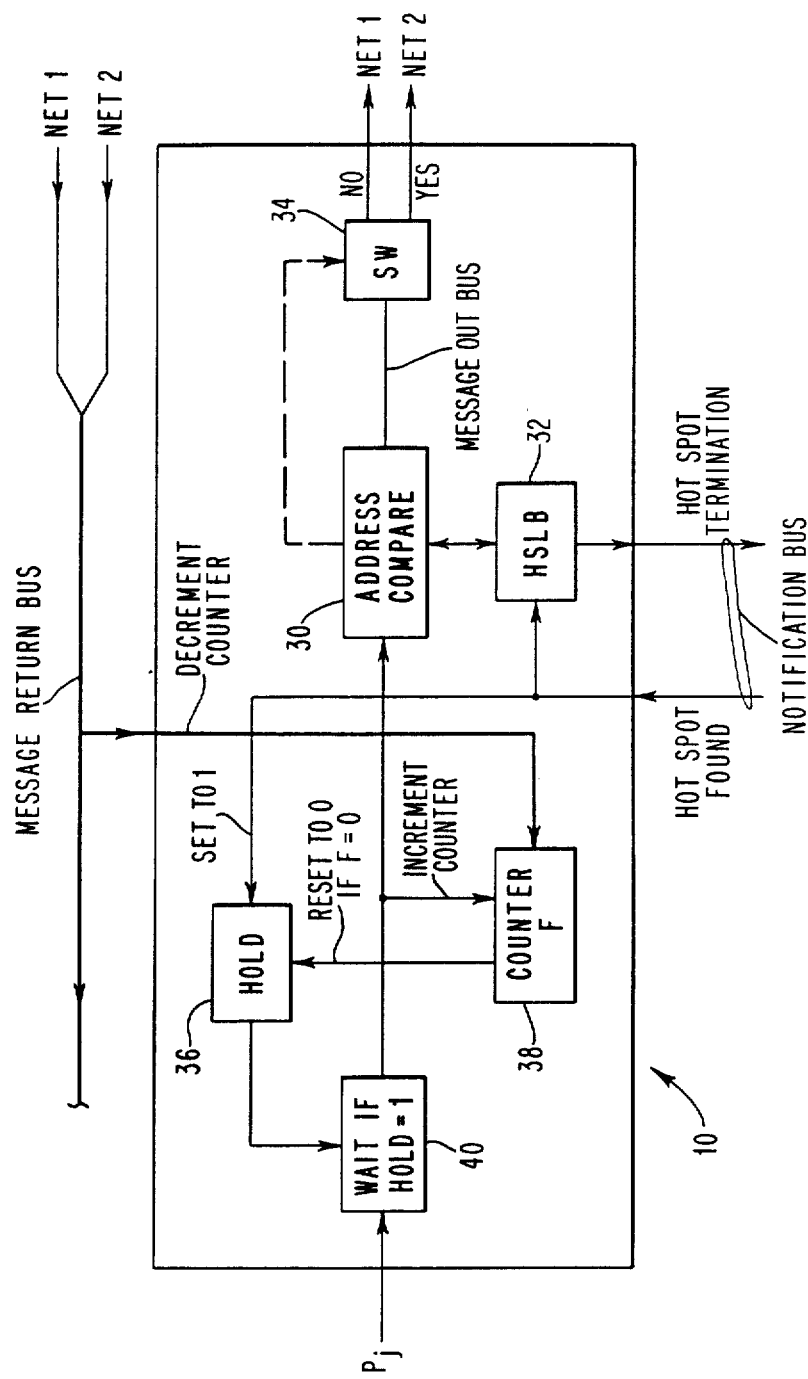
FIG. 6A is a functional schematic diagram of one of the diverter elements such as shown in FIG. 3. It illustrates the principal functional components of the diverter element similar to FIG. 4A.

The overall organization of the present interconnection network management architecture is shown very clearly in FIG. 3. In this figure, the three principal functional units of the present architecture are clearly shown. These comprise the diverter element 10, the detector element 12 and the notification means or bus 14. Also shown schematically are the two networks 16 and 18 which constitute the low-latency and the combining network, respectively; although as will be readily appreciated, these could easily be reversed with appropriate changes in the diverter controls. It should also be clearly understood that each of the n+1 processors would have a separate diverter element 10. Similarly, each of the q+1 memory modules would have its own dedicated detector element 12. A single notification bus would, of course, be used interconnecting all of the detector elements with all of the diverter elements. Similarly, all of the diverter elements and detector elements are selectively connectable to the two networks 16 and 18. As indicated in the figure, the details of a detector element 12 are shown in FIG. 4a, and the details of the diverter element 10 are shown in FIG. 6a.

To briefly recapitulate the overall operation of this system with respect to FIG. 3, it is a function of the detector elements to continually monitor each new memory address received by that detector element to see if it is a Hot Spot. Once the hardware in the detector element determines that a Hot Spot does exist in accordance with the criteria being utilized, a message is sent by that detector over the notification bus to all of the diverter elements whose Hot-Spot lookaside buffers are appropriately updated with the new Hot-Spot information. This information having been received by the diverter element and the Hot-Spot lookaside buffers appropriately updated, one of the diverter elements acts as a communicating means for the diverters (since all of the diverters ar identical and contain identical information) and notifies all of the detectors that a particular Hot Spot is being removed. As will be described subsequently, this is done on the basis of a suitable replacement algorithm, and the particular address being removed from the Hot-Spot list must be returned to the particular detector which set up that Hot Spot, via the notification bus, so that the Hot Spot is effectively removed from the Hot-Spot storage array in the detector. As will be understood, since a particular address will be involved, only one of the detectors will be affected by this address, i.e., it will refer to the block of memory or module designated by the address.

Figure 4A:
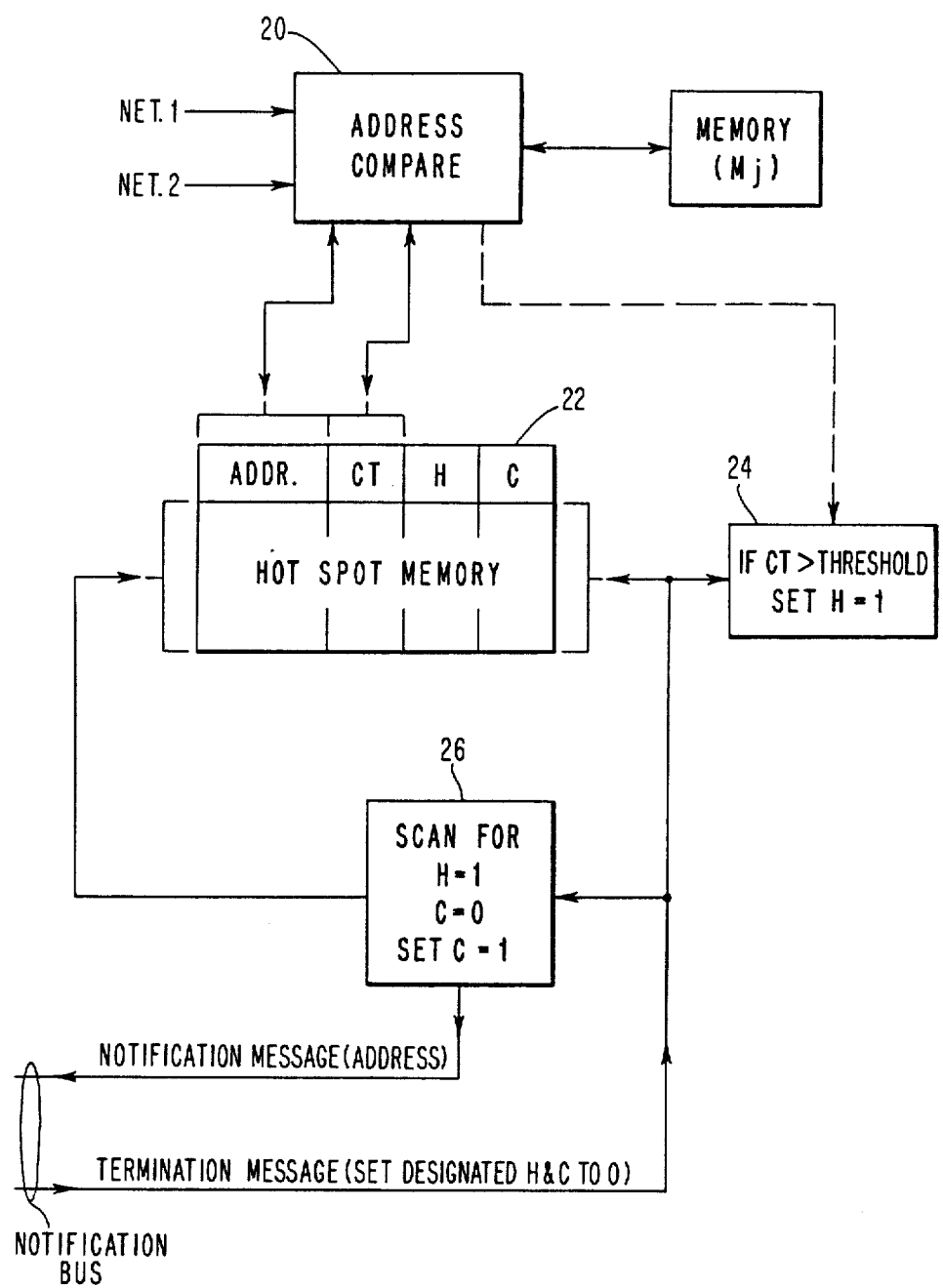
FIG. 4 comprises a functional schematic diagram of one of the detector elements which would be associated with each memory module as shown in FIG. 3. It illustrates the principal functional components of one of the detector elements of FIG. 3.
FIG. 4B is a diagram illustrating a suitable format for the Hot-Spot memory as shown in FIG. 4A.
FIG. 4C comprises a flow chart of a memoryaccess procedure indicating the operations that would ensue in the illustrated detector element of FIG. 4A.
FIG. 4D comprises a flow chart of an independent procedure for performing Hot-Spot detection within each detector element.
FIG. 4E comprises a flow chart of a termination procedure operable within each of the detector elements of FIG. 4A whenever a "termination" message is received from one of the diverter elements affirming that a particular Hot Spot has been eliminated from all of the Hot-Spot lookaside buffers within the diverter elements.

FIG. 4A comprises an intermediate level functional block diagram of one of the detector elements 12, as shown in FIG. 3. It should be remembered that all of the detector elements are identical relative to hardware content; although, they will of course vary as to data content. The primary functional elements of the detector are the address compare 20, the Hot-Spot address memory 22, the threshold count compare block 24, and a compare block 26 which periodically scans all of the Hot-Spot memory storage locations for the situation H=1, and C=0. As will be appreciated, all of the compare functions performed by blocks 20, 24 and 26 are performed relative to the contents of the Hot-Spot address memory 22.

In the figure only data and control lines are shown schematically according to the function performed and the general area of the Hot-Spot memory to which each of these functional units applies. Thus, the address compare block 20, functions to compare a currently received address against the complete contents of the Hot-Spot address memory and, is accordingly, looking at memory addresses in such an associative memory.

Block 24 examines the count field to see if the Hot-Spot threshold has been reached in the event of a successful compare in block 20. The dotted line between blocks 20 and 24 indicates that block 24 would only become operative in the event of an address compare in the Hot-Spot address memory, as will be understood subsequently. As will be appreciated, the actual threshold value used in this particular comparison is fixed and is determined by the system designers; whereas, the specific address being compared in block 20 will be different in accordance with the current address being requested within the memory unit $M_j$.

Block 26, on the other hand, operates under its own separate system clock to continually scan the H and C fields of the Hot-Spot address memory for the condition H=1, C=0, which will be explained subsequently. Assuming the Hot-Spot address memory were completely associative across all fields, this scanning operation could also be done on an associative basis; and when the search criteria are satisfied, the particular line of the Hot-Spot address memory containing the Hot-Spot address would be accessed and read out of memory and placed on the notification bus.

Specific argument and data buffers for the Hot-Spot address memory are not shown, as such memories are well known in the art and can take many configurations. Similarly, specific gating circuits and registers are not shown for the blocks 20, 24 and 26, as it is believed that hardware circuits for implementing these functions are well known to computer system designers and to show such minute levels of detail would obfuscate the invention. The control mechanism which would be used to properly sequence the hardware of FIG. 4A could typically be one or more read-only memories with associated decoders and logic circuitry which could readily be designed by those skilled in the art by referring to the flow charts of FIGS. 4C, 4D and 4E, which will be explained subsequently.

FIG. 4B illustrates a typical Hot-Spot memory format such as would be suitable for use with the present invention. Each access into the Hot-Spot address memory is determined by the address stored therein in the address field. Fields are also included for a reference count, a Hot-Spot field (H) and a notification complete field (C). Also shown is a time-stamp field, which is shown to be optional. A functional control element for this field is not shown, as system designers may or may not wish the function included. It would again be a simple compare function comparing the current setting of all of the time stamps with some current value whereby, if particular entries in the Hot-Spot address memory had not been incremented within some predetermined period of time, their reference counts could be reset to 0. Accordingly, they would not reach Hot-Spot status for a significantly longer period of time which, under certain circumstances, would improve system performance since only currently, active Hot Spots would be placed in the Hot-Spot list in the diverter elements.

The time stamp might also be used by the replacement algorithm in the detector mechanism as an additional criterion to be utilized when a particular potential Hot-Spot address is to be evicted to make room for a new address. Within this memory the address field would be as large as is required to identify the memory unit address. The reference count would have as many bits as is necessary in the view of the system designer to represent the magnitude of the highest count which would be encountered before resetting the counter. The time stamp, like the reference count, would have as many bits as is necessary to represent the current setting of the system time clock. The Hot-Spot field (H) and the notification complete field (C), of course, only require one bit in the disclosed embodiment.

Figure 4C:
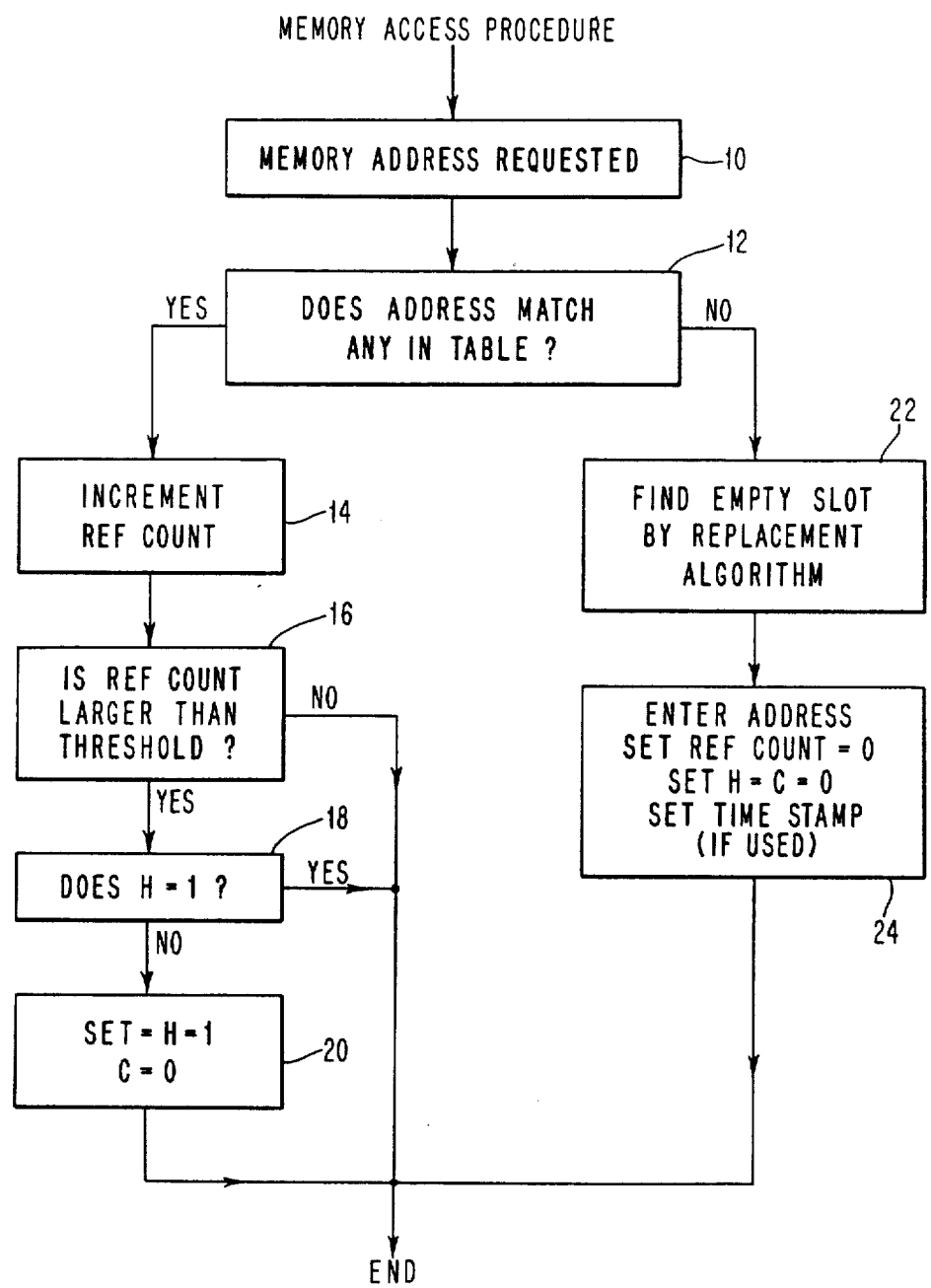

FIG. 4C represents a flow chart of those operations which would occur within the detector during a normal memory access procedure in which an address is presented to the particular memory module which must first pass through the detector element and, specifically, functional block 20 which would store the current memory address in an appropriate register and then pass the request on to the memory. This operation would occur in block 10. In block 12 a determination is made as to whether the current address matches any address currently in the Hot-Spot address memory 22. This function is performed in comparator 20 and would require the address argument to be run against all of the entries in the associative Hot-Spot address memory. If a match is found the procedure would continue to block 14. If no match were found the procedure would branch to block 22.

Assuming a match is found, block 14 causes the reference count associated with the matching address in the Hot-Spot address memory to be incremented and the procedure continues to block 16. In block 16, the magnitude of the current reference count is compared with the threshold value in comparator 24 to determine if the Hot-Spot threshold has yet been reached. If not, the procedure is completed and nothing further need be done. If the reference count is larger than the threshold, the sequence proceeds to block 18 which determines if the current Hot-Spot setting is equal to 1. This would mean that this particular address represents a Hot Spot which has already been designated and, accordingly, nothing further need be done and the procedure is terminated via the "yes" output line. If the H field does not currently equal 1, the procedure continues to block 20 which causes the appropriate H field to be set to 1 and assures that the notification completion field (C) is set to a 0. Once these operations have been completed, the procedure is terminated.

Assuming that the test made in block 12 caused the sequence to branch to block 22 in the flow chart, this would mean that the new address must be entered into the Hot-Spot address memory. Block 22 causes a replacement procedure to be initiated which will, in effect, cause one of the current lines in the Hot-Spot address memory to be evicted to be replaced by the new address. Any suitable replacement algorithm could be utilized for this operation. For example, the replacement philosophy could be least recently used, lowest reference count, etc. Such replacement algorithms are well known in the art and, accordingly, not described in detail. Also, the overall inventive concept is not conditioned on the particular replacement algorithm utilized.

When the slot in the Hot-Spot address memory is found, system controls cause the reference count field to be set to 0, the H and C fields to be set to current setting of the system clock. This terminates the procedure.

Figure 4E:
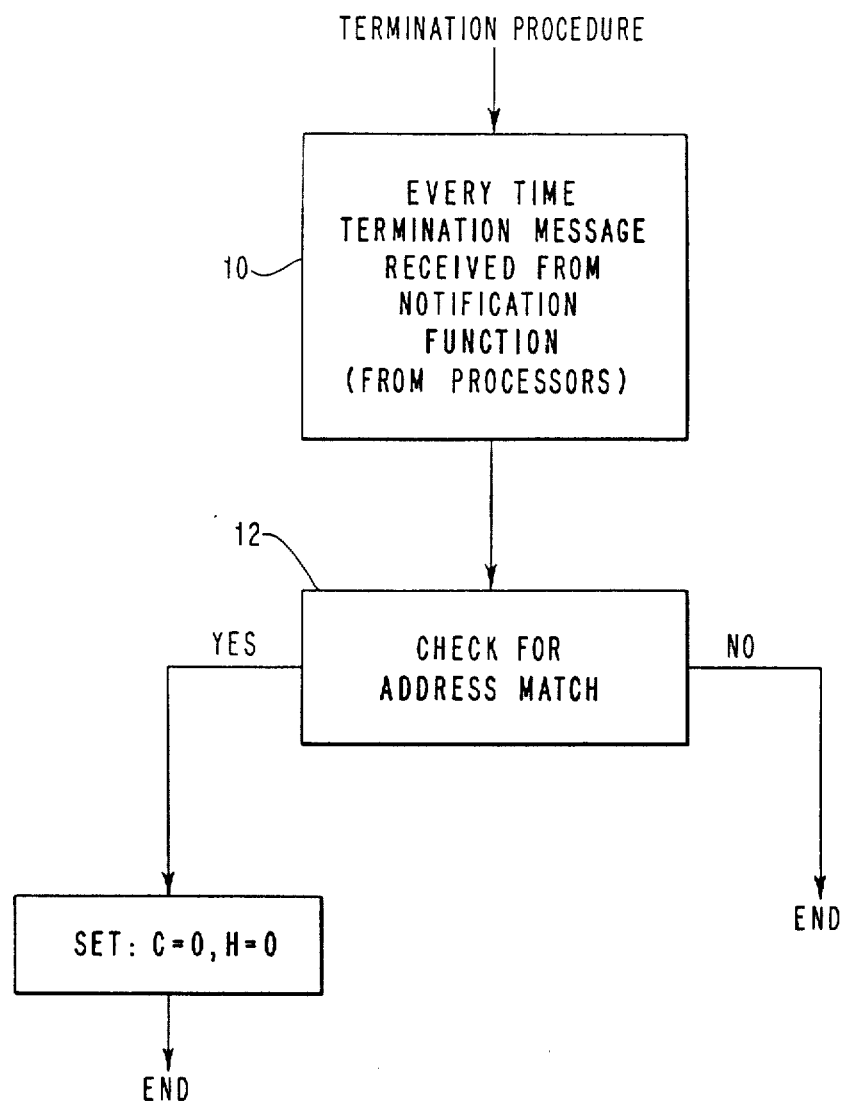

It should be understood that the procedure of FIG. 4C operates independently of the actual Hot-Spot scan procedure of FIG. 4D and the termination procedure of FIG. 4E. To recapitulate, the procedure of FIG. 4C maintains memory access or Hot-Spot statistics within each particular detector element in terms of keeping a record of the addresses requested, and inferentially how frequently they are requested, and accordingly become Hot Spots.

How this statistical data is utilized in notifying the diverter elements is shown in FIG. 4D entitled, the "Hot-Spot Scan Procedure." Block 10 implies the initiation of the procedure and, as indicated in the figure, it is stated that this would happen every memory cycle. The procedure actually operates independently of the memory access procedure; however, since it is scanning the memory continuously to look at the H field and the C field, it is convenient to add this argument to the basic associative search. However, controls would be set so that an address match would not interfere with the continuance of the Hot-Spot memory access procedure and a match in the H and C fields would allow a continuance of the Hot-Spot scan procedure independently of the memory access procedure. Functionally, however, the scan procedure may be driven by a separate clock, although it would then have to run at such times as a memory access procedure was not in effect. However, this again would be a design choice of the system designer and does not materially affect the principles of the present invention.

Proceeding with the description of the procedure, assuming that the procedure has started by block 10, the first operation is initiated by block 12 wherein comparator 26 of FIG. 4A, in effect, causes the associative memory to be scanned for the first entry therein with field H=1 and C=0.

Figure 5A:
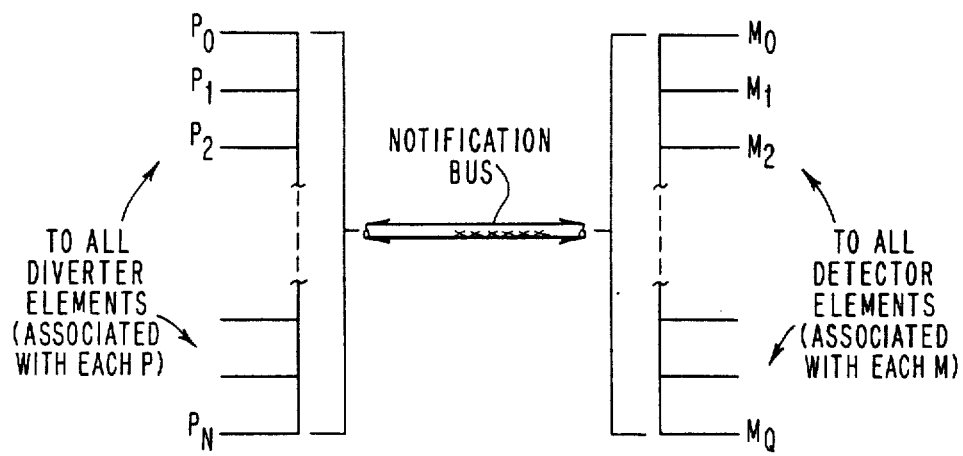
FIG. 5A comprises a diagramatic illustration of the notification bus utilized in the present system, which is separate from the illustrated networks and which connects all of the detectors to all of the diverters.
Figure 5B:
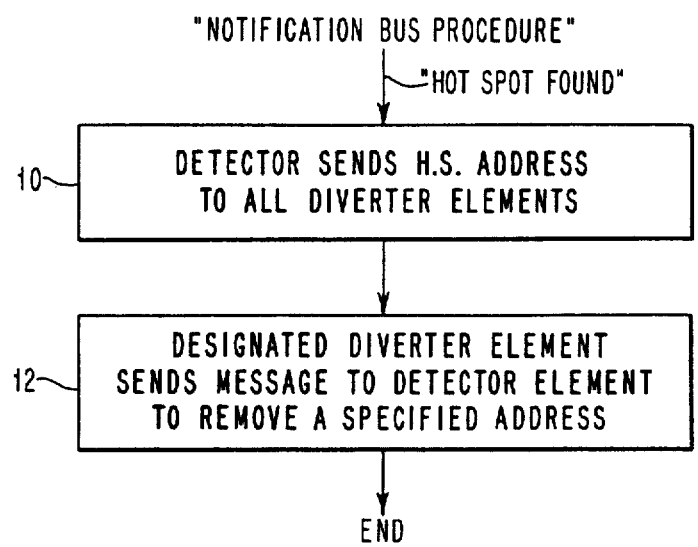
FIG. 5B is a flow chart illustrating the notification bus protocol when it is necessary to identify and remove Hot Spots within the system.

Upon completion of the search operation for the first detected but unnotified Hot Spot in block 12, the procedure continues to block 14. In block 14 a notification function is initiated on the notification bus and the newly detected Hot-Spot address is transmitted on the next available bus cycle to all of the diverter elements. At this point the Hot-Spot scan procedure goes into a "wait" state until a reply is received from the particular diverter element, which has been designated to notify all detectors of the particular Hot Spot which has been evicted from the Hot-Spot lookaside buffers. This diverter element sends a reply over the notification bus back to the detector element which sent the new Hot-Spot address. This reply is received in block 16 of the Hot-Spot scan procedure and causes the C field of the new Hot-Spot I address to be set to 1. This means that the notification function for the new Hot Spot has been completed. The other function which must be performed as the result of the termination portion of the notification function is set forth in FIG. 4E and affects, or is sent to all of the detector elements. FIG. 4E termed "Termination Procedure" is evoked whenever a termination message is received from the notification function and specifically from the notifying diverter element. This sequence is indicated as being initiated in block 10 of the figure. Briefly referring again to FIG. 4A a termination message is indicated as being received over the bottom line of the notification bus as shown on the figure and it would initiate a procedure within the detector element which would cause the address received on the termination message to be checked against all entries in the Hot-Spot address memory for a match. If no match is found the procedure terminates at the end of block 12. If a match is found the system proceeds to block 14 wherein the C field and the H field for that particular address are reset to 0. This effectively removes that particular address as a current Hot Spot. If the address were not found in the Hot-Spot address memory it would mean essentially that the address had been previously evicted by the detector element's own replacement algorithm as new addresses were introduced into the system. Conversely, if the address is still present, the system must know that this address is no longer designated as a Hot Spot, as it has been replaced by more current Hot Spots. In order to reestablish its status as a Hot Spot, a requisite number of accesses will have to be made until it reaches the prescribed Hot-Spot threshold. Referring now to FIG. 5A, a very high level organizational diagram of the notification bus, indicates that it is connected to all of the n+1 diverter elements associated with each of the n+1 processors and also to all of the q+1 detector elements associated with each of the q+1 memory modules. It is simply a two-way bus which only has to carry an address and simple control fields from the detector elements to the diverter elements. The address, of course, specifies the new Hot Spots being designated by the system and conversely the address transmitted from the designated diverter element to all detector elements indicates the particular Hot-Spot address being evicted from all of the Hot-Spot lookaside buffers. Although the message, e.g., the address, goes to all the detector elements, only the particular detector element associated with the memory module containing the address will respond to (be affected by) the message. As indicated previously the notification bus architecture could assume any of many possible forms including token ring, round robin etc. The only requirement is that access to the bus be made available to the detector elements on some regular organized basis so that no Hot Spot goes unmarked for a lengthy period of time. It is also necessary that the architecture be such that, for a full bus cycle to complete, the particular diverter element which must respond to a new Hot-Spot notification has access to the bus during the cycle immediately following the transmission of the new Hot-Spot message. Obviously this facility will also have to be tied to the architecture of the diverter element, as will be well understood by those skilled in the art. p FIG. 5B is a very simple flow chart which reiterates what has been stated above. The flow chart is labeled the "notification bus procedure" and is shown as comprising only two blocks, 10 and 12. As indicated in block 10, once a Hot Spot is found in one of the detectors, that detector must on a predetermined basis take control of the notification bus and send the new Hot-Spot address to all of the diverter elements.

Once this has been done, on the immediately succeeding bus cycle, the designated diverter element must return a confirmation message to the specific detector element whose current Hot-Spot address is being deleted from the system. As will be understood from the previous description of the operation of the detector elements, the Hot Spot is effectively removed by resetting its H field and C field to 0. This, of course, assumes that the address is still in the particular detector element's Hot-Spot address memory. If it had been previously removed by a local "replacement" operation, nothing further need be done. This completes the description of the operation and function of the notification bus.

Referring now to FIGS. 6A through 6E, the operation of the individual diverter elements will now be described. Referring first to FIG. 6A, the intermediate level functional block diagram for a diverter element is set forth. As with FIG. 4A it is deemed unnecessary to show the incremental details of the control circuitry for transferring the various addresses and control signals which would obviously gate various data items, for example, from the Hot-Spot lookaside buffer, the Hot-Spot address comparison means, etc., as well as the various registers which would be obviously included therein. Such details would be obvious to those skilled in the art when presented with the overall functional block diagram of FIG. 6A and the various flow charts of FIGS. 6C through 6E.

Again, stated very broadly, the function of the diverter elements is to determine if a new address being presented to the memory system is in fact a Hot Spot and, if so, diverting the memory access request over the high contention, e.g., combining network. Further, when a Hot Spot is found, a mechanism must be provided for entering it into the Hot-Spot lookaside buffer and a notification sent to the detector elements indicating that a current Hot Spot has been removed from the system. A mechanism is also provided which guarantees that once a new Hot Spot has been entered into the diverter elements, all current memory requests by the associated processor will be completed before a new memory request is permitted. This is to prevent any possibilities of data inconsistencies where, for example, a subsequent message might be serviced faster than an earlier message causing data to be replaced in system memory or returned to the processor out of order.

Referring now specifically to FIG. 6A, the message return bus is shown at the top of the figure and the message out bus is shown emanating from the right hand side of the diverter block 10. As will be appreciated, both of these buses refer to the network 1 and network 2, which may or may not be bi-directional. A Hot-Spot address compare operation is done in block 30 with appropriate registers wherein the current address becomes the argument in the Hot-Spot lookaside buffer (HSLB) 32 which, as stated previously, is an associative memory and if any match occurs an indication of said match will cause switch 34 to divert the current memory access to the combining network #2. If there is no comparison, this will indicate that this particular address has not yet been determined to be a Hot Spot and the switch would cause the message to be routed over low-latency network #1.

Block 26 marked "hold" is essentially a flip-flop which is immediately set to 1 when a notification is received by the diverter elements that a new Hot Spot has been found. The "counter F" 38 is for the purpose of keeping track of outstanding memory requests active in each particular diverter element at any given time. Whenever a new memory access is received, the counter will be incremented and, conversely, when a message is returned via the message return bus the counter is decremented. It will be apparent that the counter will either be set to a 0 or to some finite number depending upon the number of memory accesses that are allowed to accumulate in the system at any given time. Block 40 marked "wait if hold equals 1" is merely a switch or interlock which will functionally cause the processor to suspend memory requests whenever it is determined that hold block 36 is currently set to 1. This function is well known in the art and will, of course, require the processor to wait until it is able to issue a memory request, as will be well understood. It will also be noted that system controls would be provided associated with hold block 36 wherein as soon as it is set to 1, counter F will immediately be interrogated and, if it is currently 0, will cause hold block 36 to be reset to 0 or, conversely, to be reset to 0 as soon as counter F returns to a 0 setting.

Referring briefly to the two inputs to the bottom of the diverter element 10 marked "Hot Spot found" and "Hot-Spot termination", these refer to the two message functions performed over the notification bus. As will be understood, all of the diverter elements will respond to a Hot-Spot found message, but only a designated single diverter element need respond with a Hot-Spot termination message.

Thus, to summarize, all of the diverter elements for all the processors are essentially identical with respect to both their basic functional blocks and also the contents, at any given time, of their Hot-Spot lookaside buffers. They will contain different values in their individual counter Fs. Also, the communicating diverter element must have a control sequence for notifying the detector elements that a particular Hot-Spot address is being deleted from all of the diverter element Hot-Spot lookaside buffers.

Also, in referring to FIG. 6A it will be noted that the Hot-Spot found bus is connected to the Hot-Spot lookaside buffer 32 which causes the new Hot Spot to be stored in the buffer 32 in the position vacated by the replacement algorithm. Also, the notification bus will carry a signal causing hold block 36 to be set to 1.

Figure 6C:
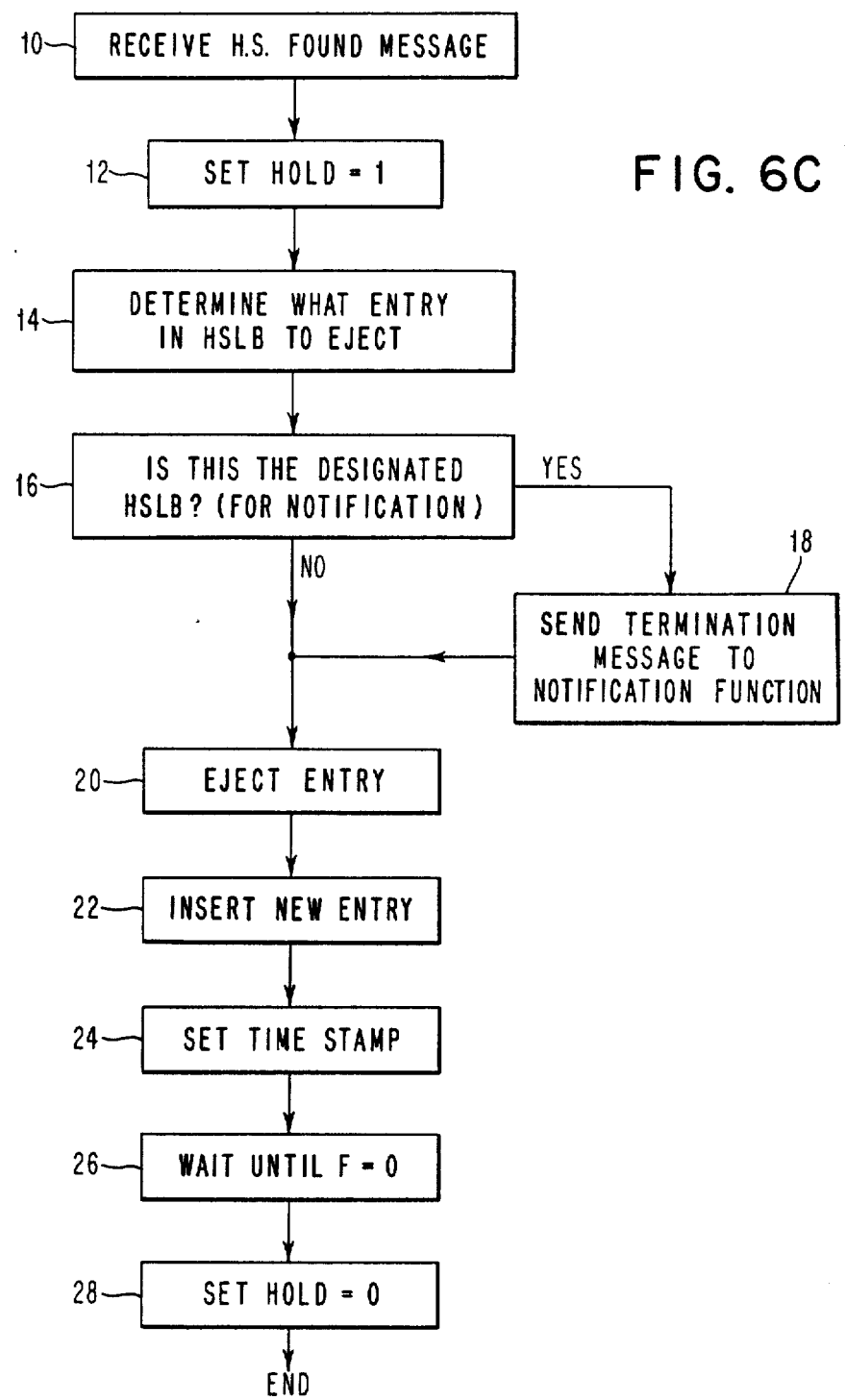
FIG. 6C comprises a flow chart of the procedure in the diverter element which occurs when a new Hot Spot is found and the diverter element is notified.

The sequence of operations which would be controlled, for example, by an appropriate ROM with the usual decoders, multiplexers and other sequencing circuitry required for the various operations within the diverter element are set forth in the flow charts of FIGS. 6C, D and E.

FIG. 6B illustrates the format of the individual Hot-Spot lookaside buffers 32. Each buffer in each diverter element is identical and also will contain identical data at any point in time. Each entry in the buffer comprises a given Hot-Spot address and a time stamp indicating when the Hot Spot was entered into the system. The time stamp is for the use of the replacement algorithm for the buffer and will determine what Hot Spot will be evicted when a new Hot Spot is found. This is a simplified replacement algorithm and other more sophisticated algorithms could be utilized if desired. It is of course necessary that, whatever replacement algorithm is utilized, all of the lookaside buffers and all of the diverter elements must utilize the same replacement algorithm to assure that the same address is evicted from all elements.

Referring now to the flow chart of FIG. 6C, this figure details the sequence of events which must occur when a Hot Spot is found by one of the detector elements and notifies all of the diverter elements of this fact with the appropriate data, e.g., the address of the Hot Spot. Block 10 initiates the procedure within the diverter element and proceeds to block 12 wherein the hold mechanism 36 is set to a 1. The procedure then continues to block 14.

In block 14 a replacement algorithm within each of the diverter elements is invoked which makes a decision a to which "current" Hot Spot must be evicted from the Hot-Spot lookaside buffer, as described previously. A pointer will indicate the storage location within the Hot-Spot lookaside buffer where the new entry is to be inserted. The procedure then continues to block 16.

Block 16 is not an actual procedural step in the sense that all of the diverter elements with the exception of the one selected for the notification function would proceed directly from block 14 to block 20; however, the notifying diverter element must enter block 18 wherein the address of the evicted member of the Hot-Spot lookaside buffer must be sent over the notification bus to the detector elements for appropriate updating of their Hot-Spot address memories.

In block 20 it is stated that the entry is ejected and a new entry is inserted in block 22. In actuality, as stated above, the new entry would simply be overwritten over the old entry in the Hot-Spot lookaside buffer. The procedure then continues to block 24 in which the time-stamp field for the new entry would be set. Again, it should be remembered that the time stamp would be set and thus a time-stamp field provided only if the time stamp were to be utilized in the replacement algorithm. The completion of block 24 initiates block 26.

Block 26 constitutes a time-out or wait operation in the overall procedure, wherein the setting of the counter F is continuously sampled to determine whether or not it is set to a value 0, meaning that there are no current memory requests still outstanding. When it is determined that the counter F has been decremented to 0 (or was set on 0 when the new Hot-Spot entry was placed in the Hot-Spot lookaside buffer) the procedure would continue to Block 28.

In Block 28 the hold flip-flop is reset to 0, which allows the particular diverter element and its associated processor to resume memory operations. Once this occurs the procedure is terminated.

Figure 6D:
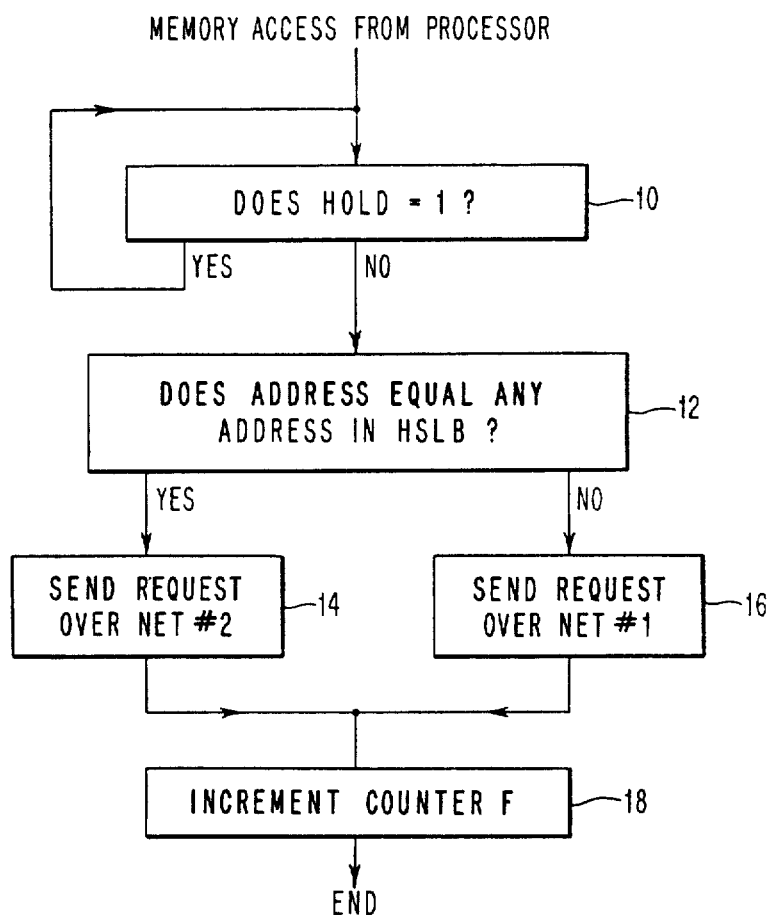
FIG. 6D comprises a flow chart of the procedure performed within the diverter element whenever a standard memory access from the associated processor is received and a decision must be made as to which interconnection network will be used for the access request.

Referring now to FIG. 6D, a customary memory access from the processor is performed by the diverter element. Block 10 invokes the interrogation of the hold flip-flop of block 36. If it is set to a 1 the system waits or idles until it is reset to a 0. This operation is frequently referred to in the art as a "fence" operation. One such specific prior art reference is in the previously referenced article, "The RP3 Processor/Memory Element," on page 787, Section 7.3. The controls determine that if hold equals 0 the procedure continues to block 12.

Block 12 causes the current address presented by the processor to the diverter element to be utilized as an argument against the Hot-Spot lookaside buffer and a determination made, e.g., within comparator 30, to see if the current address is in fact a Hot Spot. It should be noted further in passing that in view of the architecture of the associative memory which actually comprises the Hot-Spot lookaside buffer, in essence the comparison is made within the Hot-Spot lookaside buffer itself and the comparator 30 of FIG. 6A would, in effect, be a holding register. If no match is found the procedure continues to block 16 and the memory access request is sent over the low-latency network #1. If a match had been found the procedure would have continued to block 14, causing switch 34 to send the request over the more complex network #2, e.g., combining. The completion of the steps of blocks 14 or 16 causes the procedure to continue to block 18.

Block 18 causes counter F to be incremented by one which, as will be remembered, keeps track of the current outstanding requests from the diverter elements associated processor. Incrementing of the counter F terminates the procedure.

Figure 6E:
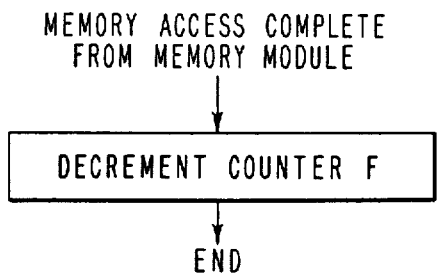
FIG. 6E comprises a one-step flow chart of the operation which occurs within the diverter element when a memory reference is completed.

FIG. 6E is, in essence, a one-step flow chart and constitutes the only action which must take place within the diverter element when a message is returned from the memory system indicating that a memory access operation is complete. If for example, it were a load request, data would accompany the "operation complete" signal; otherwise, only the signal would be returned as is well known in the art. As stated above, counter F keeps a running count of the outstanding memory requests from the processor. It will of course be understood that this is merely a gross count, as that is all that is required of the system to keep requisite data consistency in view of all of the previously enumerated controls and sequences. This completes the description of the invention. It will of course be understood that many changes in form and details could readily be made by those skilled in the art without departing from the spirit and scope of the invention.

For example, the specific hardware details of the mechanisms for performing both the detector function and the diverter function could vary widely as extensively discussed in the specification and their functions could be suitably distributed between hardware, software and firmware more as is well known in the art. Similarly, the specific order or sequence of the various procedures set forth in the flow charts could, likewise, be changed. However, the essential detection, diversion and notification functions for controlling an at least two-network interconnection system are believed to be broadly novel, especially in such a demanding environment as a large, complex high-speed multiprocessing computer system utilizing a plurality of separately addressable memory modules, all of which must be selectively available to all of the processors at given time. Accordingly, it is intended that the scope of the present architectural concepts be limited solely by the scope of the appended claims.

We claim:

1. IN a large shared memory multiprocessor system including a plurality of processors and a plurality of separately addressable memory modules, each of which is accessible by any of said processors over a memory interconnection network, the improvement in said system wherein said memory interconnection network comprises at least two parallel interconnecting networks comprising a first low-latency network over which memory requests having a low probability of contention are routed, and a second network over which memory requests having a higher probability of memory contention are routed, Hot-Spot detection means connected to each memory module for detecting when a particular address has become a Hot Spot based on predetermined frequency of access criteria, a diversion means connected between an output of each processor and the memory interconnection network for selectively routing memory requests to either said first or second parallel interconnecting network, Hot-Spot notification bus means interconnecting all of said diversion means and all of said Hot-Spot detection means and means within each detection means for notifying all of said diversion means when a Hot Spot is encountered, and each said diversion means further including means for determining if a current memory request is a currently designated Hot Spot, and, if so, routing said memory request over said second high contention network.

2. A large shared memory multiprocessor computer system as set forth in claim 1, wherein U.S. patent application Ser. No. 07/186,327 the Hot-Spot detection means includes means for keeping a Hot-Spot count which comprises a count of the number of requests for the same memory location address within a predetermined timeframe.

3. A large shared memory multiprocessor computer system as set forth in claim 2, further including means in each Hot-Spot detection means for periodically reducing the Hot-Spot count associated with each memory location address stored therein.

4. A large shared memory multiprocessor computer system as set forth in claim 3, wherein the Hot Spot detection means for notifying the diversion means that a new Hot Spot exists includes means for notifying all of the diversion means connected to the Hot Spot notification bus means that a new Hot Spot has been detected as soon as the Hot Spot notification bus mean's protocol permits, whereby all of the diversion means associated with each processor have identical lists of hot spots.

5. A large shared memory multiprocessor computer system as set forth in claim 4, wherein each processor includes address translation means for 6. A large shared memory multiprocessor computer system as set forth in claim 4, including further means in said diversion means for keeping track of current Hot Spots which comprises an associative memory (HSLB) having at least a searchable address field and including means for comparing every new memory access request presented to the diversion means with all of the address fields stored in said memory.

7. A large shared memory multiprocessor computer system as set forth in claim 6, wherein the associative memory is set associative and includes means for replacing a Hot-Spot address therein within the same set to which any new Hot Spot address belongs when such new address is received over the notification means.

8. A large shared memory multiprocessor computer system as set forth in claim 6, wherein each said diversion means includes means operable whenever a new Hot Spot address is received from the detection means via said Hot-Spot notification bus means, for entering the Hot Spot address in the HSLB memory and for preventing any new memory accesses from each associated processor until all currently active accesses have been completed.

9. A large shared memory multiprocessor computer system as set forth in claim 8, wherein said means for preventing any new memory accesses includes a counter which is incremented whenever a new memory access is received and decremented whenever an access complete signal is received from any of said memory modules.

10. A large shared memory multiprocessor computer system as set forth in claim 6, wherein the means in each said detection means for keeping track of current Hot Spots comprises an associative memory having at least a searchable address field and including means for comparing every new memory access request presented to the detection means with all of the address fields stored in said memory.

11. A large shared memory multiprocessor computer system as set forth in claim 10, wherein the associative memory is set associative and includes means for replacing a Hot-Spot address therein within the same set to which any new Hot-Spot address belongs where such new address is received over the interconnection network and it is determined that the address is not currently resident in the memory.

12. A large shared memory multiprocessor computer system as set forth in claim 2, wherein the means for keeping a Hot-Spot count includes an associative memory having a plurality of associatively searchable memory location addresses stored therein and having at least one count field accompanying each memory location address and means for incrementing said count field for keeping track of said number of accesses to each said address.

13. A large shared memory multiprocessor computer system as set forth in claim 12, wherein each detection means includes mean for periodically scanning the count fields in the associative memory for a Hot-Spot threshold value and marking (H=1) those addresses whose count field has reached the threshold as Hot Spots.

14. A large shared memory multiprocessor computer system as set forth in claim 13, wherein each said detection means includes further means for determining if any addresses have reached Hot-Spot status and that the diversion means have not been notified and, if so, notifying all of said diversion means of the new Hot Spot and upon receipt of a "notification complete" signal from at least one of said diversion means indicating that the diversion means have been so notified.

15. In a large shared memory multiprocessor computer system including a plurality of processors and a plurality of separately addressable memory modules, each of which is accessible by any of said processors over a memory interconnection network, the improvement in said system which comprises at least two parallel inter-connecting networks comprising a first, low-latency network over which memory requests having a low probability of contention are routed and a second network over which memory request having a high probability of memory contention are routed, said routing being performed by a diversion means associated with each processor, Hot-Spot detection means connected to each memory module for detecting when a particular address has become a Hot Spot, including:

means for keeping a count of the number of requests for the same memory address within a predetermined timeframe, said means comprising an associative memory having at least one counter field associated with each address field for maintaining a record of said number of accesses to each said address and including means for comparing every new memory access request presented to the detection means with all of the address fields stored in said associative memory, each detector means further including means for periodically scanning the counter fields in the associative memory for a Hot-Spot threshold value (H) and marking (H=1) those addresses whose count field has reached the threshold as a Hot Spot, further means for scanning the counter fields to determine if any addresses have reached Hot-Spot status and that the diversion means have not yet been notified and, accordingly, notifying all of said diversion means of the new Hot Spot and, upon receipt from at least one of said diversion means of a "notification complete" signal, indicating that the diversion means have been so notified, means in each detection means for periodically reducing the Hot-Spot count associated with each address stored therein, said diversion means being connected between an output of each processor and the memory interconnection network for selectively routing a memory request over either said first or second networks, Hot-Spot notification bus means interconnecting all of said diversion means and all of said Hot-Spot detection means including means within each detection means for notifying, via said notification means, all of said diversion means when a Hot Spot is encountered as soon as the protocol of the notification means permits, whereby all of the diversion means associated with each processor have identical lists of Hot Spot addresses, said diversion means including an associative memory (HSLB) having at least a searchable address field and including means for comparing every new memory access request presented to the diversion means with all address fields stored in said memory for determining if said new memory access request is a currently designated Hot Spot, and, if so, routing said memory request over said second high contention network, and means for entering a new Hot Spot address in the HSLB memory whenever a new Hot Spot address is received via said Hot-Spot notification bus means and means for preventing any new memory accesses from each associated processor until all currently active accesses have been completed comprising a counter which is incremented whenever a new memory access is received and decremented whenever an access complete signal is received from the memory system.

16. A method for detecting Hot-Spot memory references and diverting same over a high contention interconnection network in a large shared memory multiprocessor computer system including a plurality of processors and a plurality of separately addressable memory modules selectively accessible over either (1) a low-latency interconnection network or
(2) a high contention interconnection network said method including a plurality of procedures comprising;

a detection procedure operable in response to any access to any of the memory modules, each memory module having a detection procedure which services it, for continuously monitoring memory references in each module and keeping track of those memory references which are Hot Spots, a diversion procedure operable in response to every memory access from any processor in said system which examines a list of current Hot Spots in an associated hot-spot table and routes a particular memory access request over the first network if said particular access address is not a Hot Spot or over the second network if the current address is a designated Hot Spot, each processor having a diversion procedure which services it, and a notification procedure whereby each detection procedure selectively notifies all diversion procedures whenever a new Hot Spot is encountered and wherein a single designated diversion procedure notifies the detection procedure that found the Hot-Spot that the new Hot-Spot designation has been received and enter end into the current list of Hot Spots in all of the diversion procedures.

17. A method for detecting Hot-Spot memory references and diverting same as set forth in claim 16, wherein said detection procedure includes a "memory access" procedure comprising the steps of:

Step 1—determining if a new address matches any address stored in a Hot-Spot memory table and, if so, proceeding to step 2, and, if not, proceeding to step 6, Step 2—Incrementing a count field associated with the address in the Hot-Spot memory table and proceeding to step 3, Step 3—determining if a current count is larger than a threshold value which defines a Hot Spot and, if so, proceeding to step 4, and, if not, terminating the "memory access" procedure, Step 4—determining if all of the diversion procedures have been notified that the current address is a Hot Spot and, if so, terminating the memory access procedure, and, if not, proceeding to step 5, Step 5—communicating the new Hot-Spot address to the diversion procedure via the notification procedure and terminating the memory access procedure, Step 6—finding an empty slot in the Hot-Spot table by the use of a replacement algorithm and proceeding to step 7, Step 7, —entering the new address in the Hot-Spot table and resetting an associated counter field to zero and resetting control fields in the hot spot table used for notifying the diversion procedures that the address comprises a Hot Spot and terminating the memory access procedure.

18. A method for detecting Hot-Spot memory references and diverting same as set forth in claim 17, wherein said detection procedure further includes a "Hot-Spot scan" procedure including the steps of:

Step 1—periodically scanning the Hot-Spot table for ad-dresses which have reached Hot-Spot status but have not been sent to the diversion procedure and proceeding to step 2, Step 2—sending the address to all of the diversion procedures and after waiting for a predetermined period of time proceeding to step 3, Step 3—when a reply is received from the diversion procedure that the new Hot Spot address has been entered, setting a notification field (C) within the Hot-Spot table to a value which indicates that the particular address has been transmitted as a new Hot Spot address and returning to Step 1.

19. A method for detecting Hot-Spot memory references and diverting same as set forth in claim 18, said detection procedure further including a "termination procedure" operable whenever a message is received from the designated diversion procedure via the notification procedure that a particular Hot-Spot address is being replaced which comprises:

Step 1—determining if the address returned via the notification procedures is currently stored in the Hot-Spot table and, if not, terminating the "termination procedure" and, if so, proceeding to step 2.

b Step 2—resetting the fields associated with the address in the Hot-Spot table indicating that the address is no longer a Hot spot and that it has been removed from the Hot-Spot tables associated with each diversion procedure associated with each processor.

20. A method for detecting Hot-Spot memory references and diverting same as set forth in claim 19, wherein said notification procedure comprises a method performable in consecutive bus cycles on a notification but, that procedure being operable when a Hot Spot is found by a particular detection procedure, said notification bus protocol comprisings.

Step 1- the particular detection procedure takes control of the bus and causes a Hot-Spot address to be sent to all of the diversion procedures and proceeds to cause 2, Step 2—the diversion procedure designated by the system responds over the notification of bus to all detection procedures on the immediately following bus cycle indicating that the returned address is being removed from Hot-Spot tables maintained by said diversion procedures.

21. A method for detecting HotSpot memory references and diverting same as set forth in claim 20, wherein said diversion procedure includes a "received new Hot Spot Found" procedure operable in response to a message over the notification bus that a new hotspot has been found comprising:

Step 1—inhibiting any further memory access requests from the processor being controlled by the diversion procedure and proceeding to Step 2, Step 2—determining what entry in the Hot-Spot table to delete and proceeding to step 3, Step 3—notifying all of the detection procedures that a new Hot Spot has been received and identifying an Old Hot-Spot address removed from the Hot-Spot table and proceeding to step 4, Step 4—replacing the old Hot-Spot address with the newly received Hot-Spot address in the Hot-Spot tables and proceeding to step 5, Step 5- determining if all current outstanding memory requests in progress, when the new Hot Spot was found have been completed and if so, resuming normal memory accesses from a processor executing the received new Hot Spot Found procedure and terminating same and, if not, waiting until said memory accesses are completed and then resuming normal memory access operations.

22. A method for detecting Hot-Spot memory references and diverting same as set forth in claim 21, said diversion procedure including a "memory access from processor" procedure comprising:

Step 1—determining if new memory accesses are being accepted and, if so, proceeding to set 2 and, if not, repeating step 1, Step 2—determining if the current address equals any in the Hot-Spot table and, if so, proceeding to step 3, and, if not, proceeding to step 5, Step 3—sending the memory access request over the high contention network and proceeding to step 4, Step 4—incrementing a counter field which keeps a record of the number of currently outstanding memory access requests and terminating the memory access from processor procedure, Step 5- sending the memory request over the low-latency network and proceeding to step 4.

23. A method for detecting Hot-Spot memory references and diverting same as set forth in claim 22, wherein the "memory access from processor" sequence includes: decrementing the counter field whenever a memory access complete signal is returned to the processor from an accessed memory module.

* * * * *